No. 744,388. PATENTED NOV. 17, 1903.
G. W. OLIVER.
BOLT AND NUT LOCKING DEVICE.
APPLICATION FILED JULY 30, 1903.
NO MODEL.

Witnesses.
H. S. Wilson
Jos H. Linton

Inventor.
George Washington Oliver

No. 744,388.

Patented November 17, 1903.

UNITED STATES PATENT OFFICE.

GEORGE WASHINGTON OLIVER, OF ST. LOUIS, MISSOURI.

BOLT AND NUT LOCKING DEVICE.

SPECIFICATION forming part of Letters Patent No. 744,388, dated November 17, 1903.

Application filed July 30, 1903. Serial No. 167,648. (No model.)

*To all whom it may concern:*

Be it known that I, GEORGE WASHINGTON OLIVER, a citizen of the United States, residing at St. Louis, in the State of Missouri, have invented certain new and useful Improvements in Bolt and Nut Locking Devices, of which the following is a specification.

My invention relates to that class of bolt and nut locking devices in which a washer surrounding the bolt is constructed to engage the side of the nut and to lock it to the object to which the bolt and nut are applied.

The object of my invention is to provide a simple and inexpensive device of this general class which may be easily applied and which will securely lock the nut and bolt in place and will prevent their separation or loosening either by jars or by the expansion or contraction of any of the associated parts.

In carrying out my invention I do not in any way change or modify either the nut or the bolt. These are of usual construction. I employ two washers, one of which consists of a flanged ring, preferably of relatively soft metal, while the other consists of a hard metal (preferably spring-steel) ring having one or more series of radial corrugations that are V-shaped in cross-section. This latter washer is adapted to be placed on the threaded end of the bolt and to have the sharp edges of the V-shaped corrugations placed next the object to which the bolt is applied while the grooves of the corrugations face outward. The flanged washer is placed against the outer face of the corrugated washer and receives the nut. When the nut is screwed home, the corrugations are caused to engage and take a firm hold of the object to which the bolt is applied, and afterward portions of the flanged washer are driven into the grooves of the corrugated washer, thereby locking the two washers together, while the nut is held by the flange of the outer washer. While the corrugated washer is being made to engage the object to which the bolt is applied, the corrugations are somewhat compressed, and thus any expansion of the bolt is compensated for by the relaxation of the corrugations.

Figure 1:
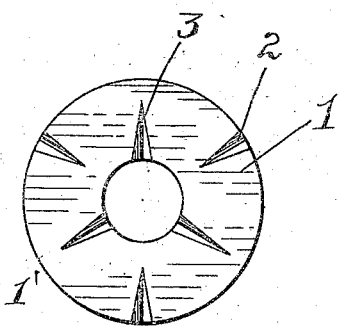
Figure 2:
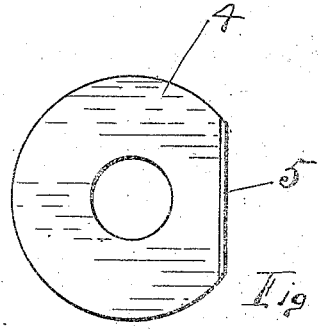
Figure 3:
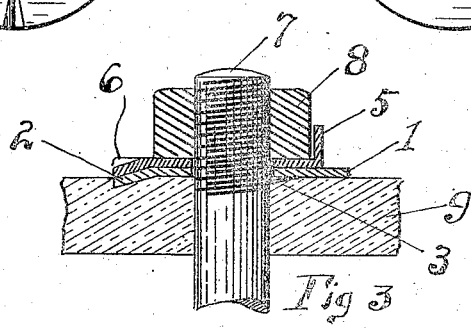
Figure 4:
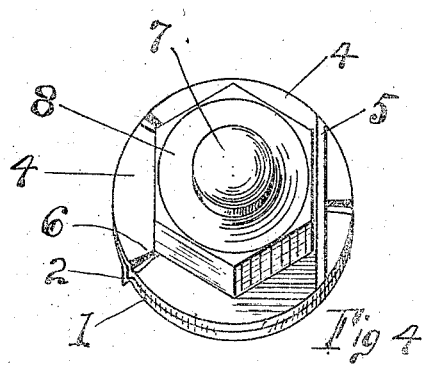

In the accompanying drawings, Figure 1 shows a top plan view of the corrugated washer. Fig. 2 shows a top plan view of the flanged washer. Fig. 3 shows a vertical central section through the nut and washers with the bolt in elevation. Fig. 4 shows a perspective view of the assembled parts.

The bolt 7 and nut 8 are of usual form or may be of any suitable construction. I have illustrated a hexagonal nut; but any polygonal nut may be employed. The corrugated washer 1 is annular and is preferably made of spring-steel or of such metal as will present ribs suitable to engage the object to which the device is applied. It is provided with an outer series of radial corrugations 2 and an inner series of like corrugations 3. These corrugations are V-shaped in cross-sections, or they may be of other suitable form to provide grooves on one side of the washer and ribs on the opposite side. The corrugated washer is placed on the end of the bolt with its ridges next the object 9 to which the bolt is applied. The flanged washer 4 is preferably made of relatively soft metal or such metal as will enable it to have one or more portions driven into the grooves of the corrugations 2. This washer is annular in form, but on one side is provided with a perpendicular flange 5. This washer is placed on the threaded end of the bolt and is adapted to rest against the outer face of the corrugated washer in the manner indicated in Fig. 3. The nut 8 rests against the outer face of the flanged washer 4, with one of its sides against the flange 5. At first when the nut is being screwed onto a bolt the flanged washer 4 may turn with the nut; but when the nut is screwed home the washer 4 and nut 8 are held stationary by reason of the engagement of the washer 4 with the corrugated washer 1. In the act of screwing the nut home the corrugations 2 and 3 are caused to engage the object 9, to which the bolt is applied, in the manner indicated in Fig. 3. The corrugations are slightly compressed and put under tension and are driven into the object 9, if this object is of soft material, such as wood. The corrugations 3 will enter the oval hole of a fish-plate, if the bolt is applied to a railway-fastening. In order to make the connection entirely secure, the soft-metal washer may be driven into one or more of the grooves of the corrugations, as indicated at 6 in Fig. 3. When the parts are thus locked together, there is no danger of their working loose. Should it be desired to remove the nut, it can be most conveniently done by merely bending over the flange 5 or breaking it off with a suitable tool, thus preserving the more expensive part 1.

I claim as my invention—

1. A bolt and nut locking device comprising a metal washer having radial corrugations forming grooves on one side and ribs on the opposite side and a superposed washer having a perpendicular flange adapted to engage the nut and which is adapted to be placed against the grooved side of the corrugated washer and to have parts driven into the grooves thereof.

2. A bolt and nut locking device comprising a metal washer having corrugations V-shaped in cross-section forming grooves on one side of the washer and ribs on the opposite side thereof and a superposed washer adapted to bear against the grooved side of the first-mentioned washer and to have parts driven into the grooves thereof and having also a flange adapted to engage a nut.

3. The combination of a bolt, a nut, a washer having corrugations near its periphery and also near its center which form ribs on one side of the washer and grooves on the opposite side thereof and a superposed washer adapted to rest against the grooved side of the first-mentioned washer and to have parts driven into the grooves of said washer and having also a flange adapted to engage a nut.

GEORGE WASHINGTON OLIVER.

Witnesses:
H. S. WILSON,
JOS. H. LINTON.